March 16, 1965 M. L. ANTHONY 3,173,203
MACHINE TOOLS
Filed Dec. 29, 1960 5 Sheets-Sheet 1

INVENTOR.
MYRON L. ANTHONY
BY Wallace, Kenzer & Horn
ATTYS.

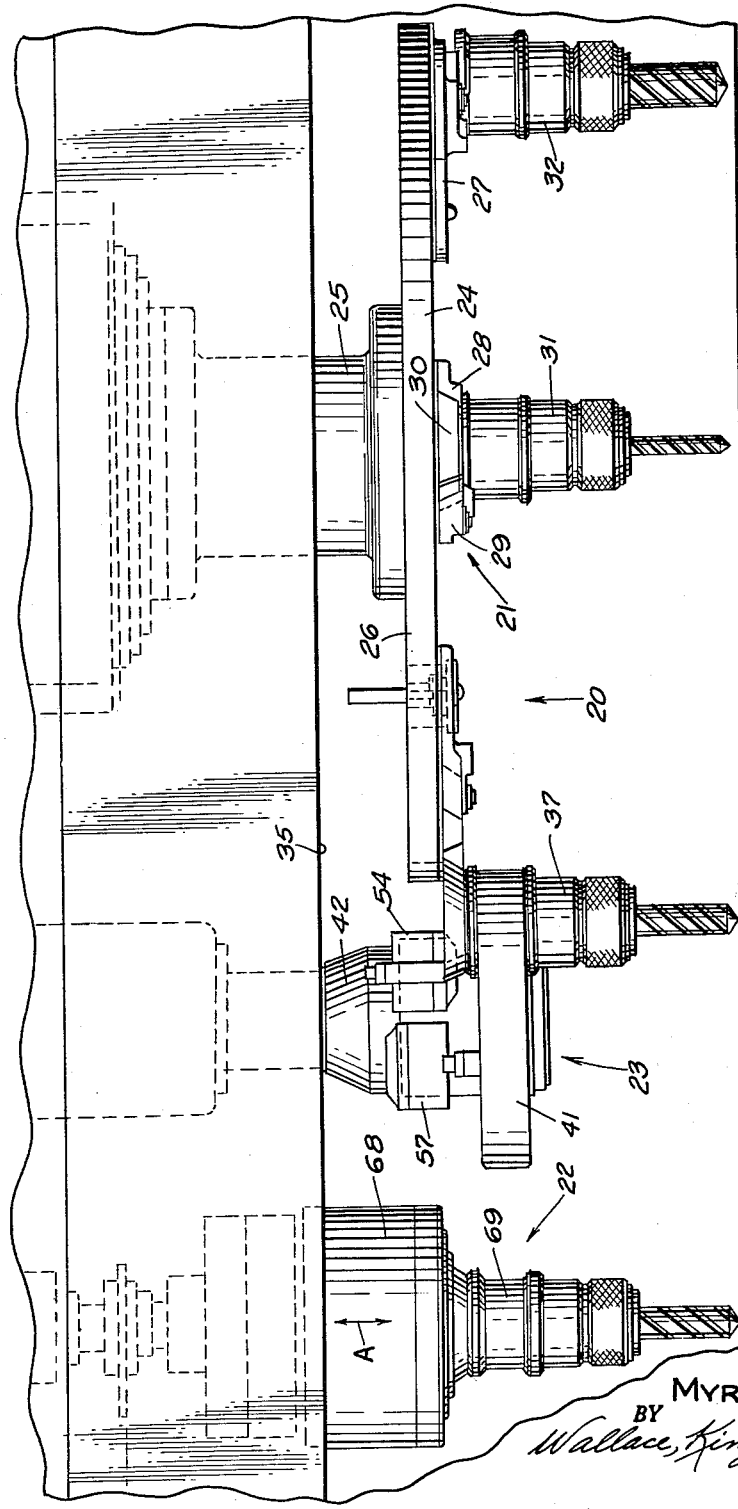

March 16, 1965    M. L. ANTHONY    3,173,203
MACHINE TOOLS
Filed Dec. 29, 1960    5 Sheets-Sheet 3
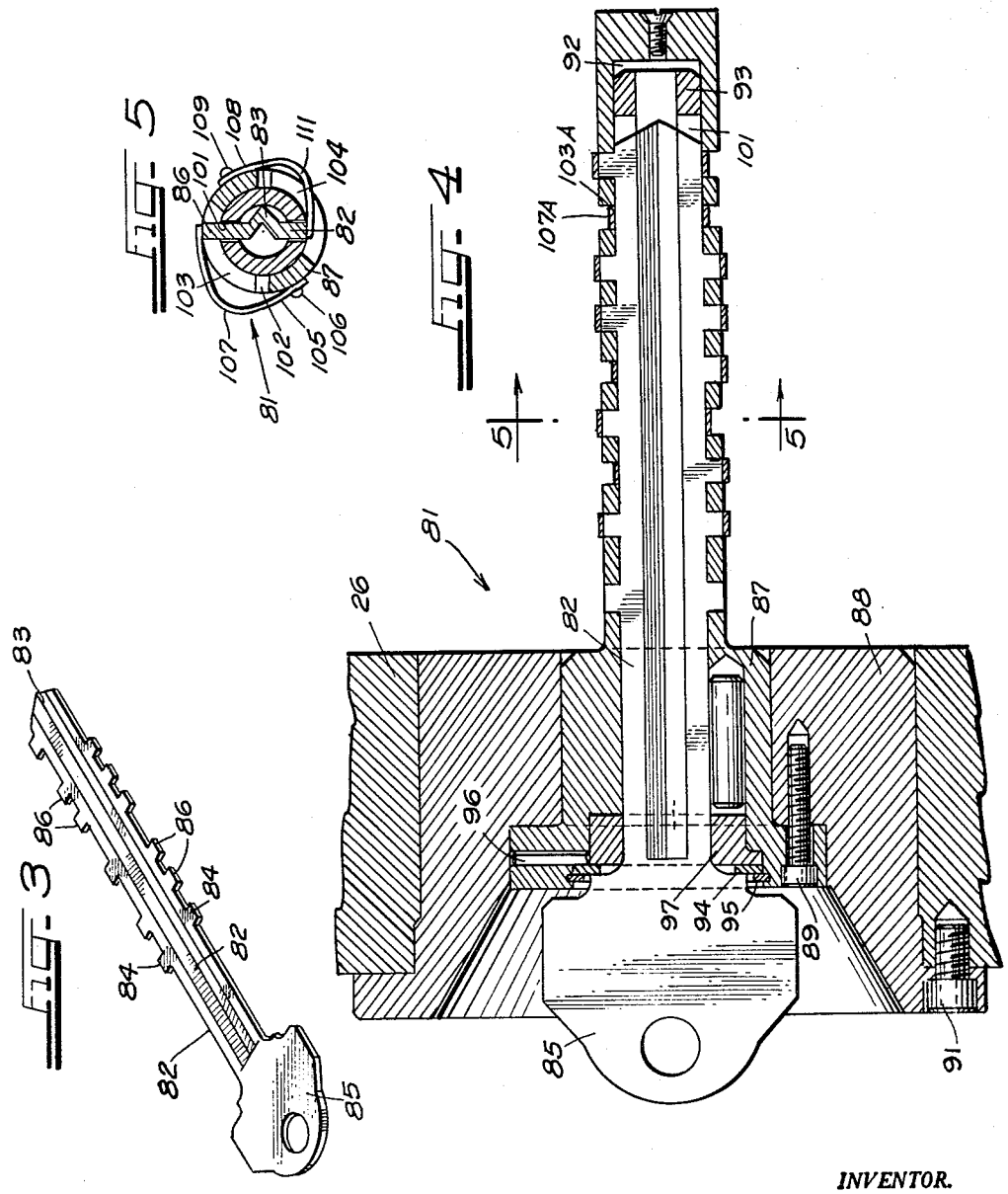
INVENTOR.
MYRON L. ANTHONY
BY
Wallace, Flinger & Horn
ATT'YS.

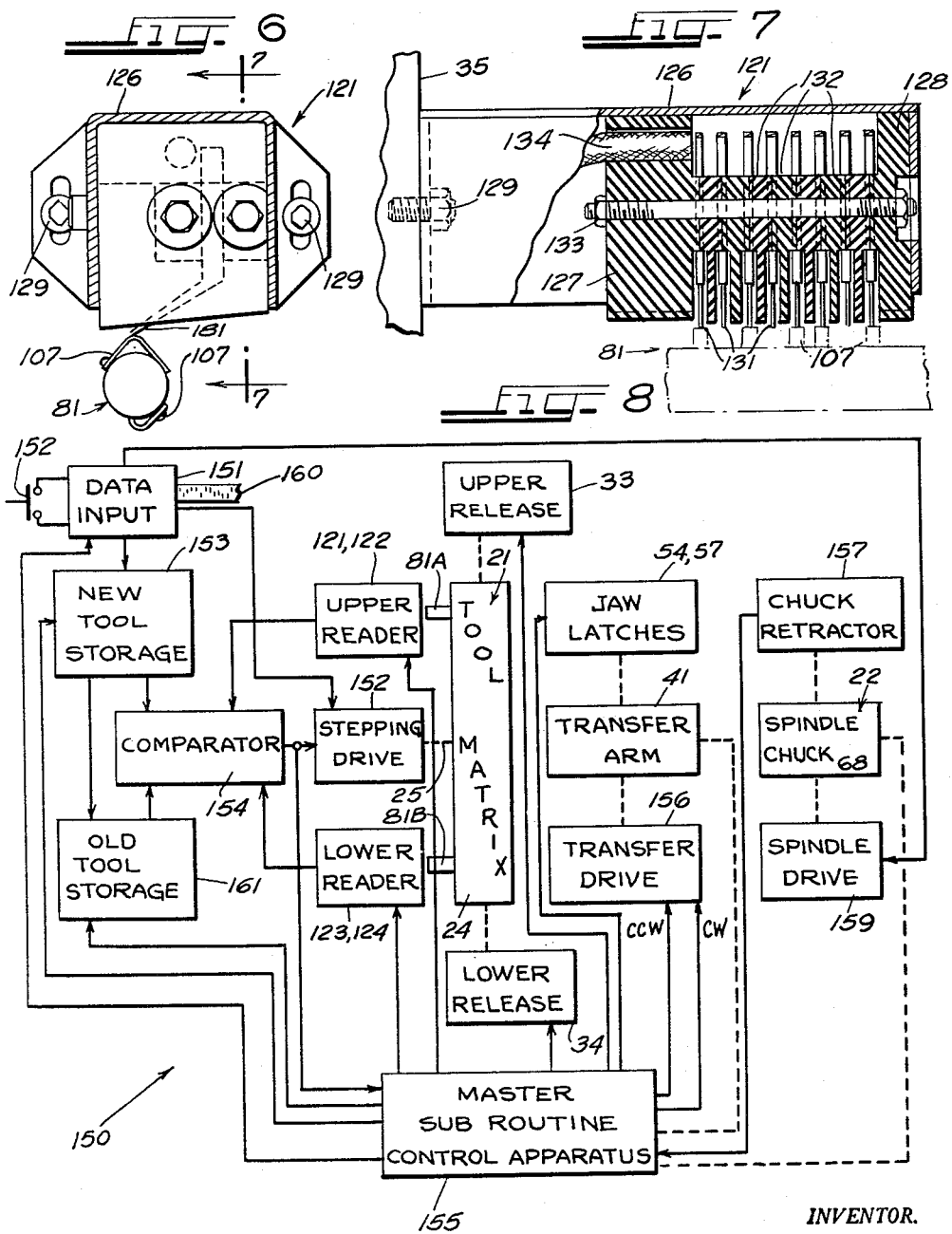

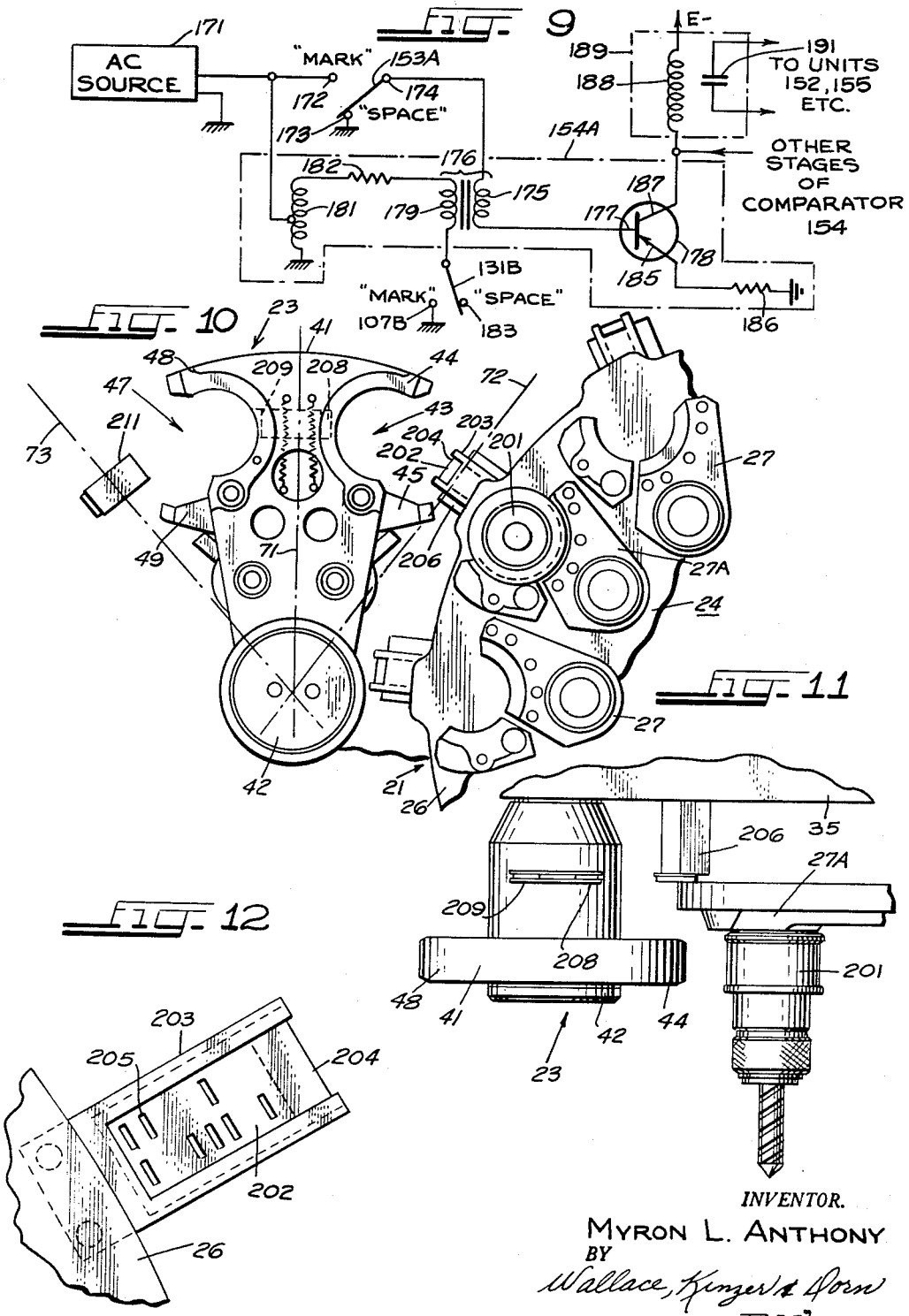

United States Patent Office 3,173,203
Patented Mar. 16, 1965

3,173,203
MACHINE TOOLS
Myron L. Anthony, La Grange, Ill., assignor to Scully-Anthony Corporation, La Grange, Ill., a corporation of Illinois
Filed Dec. 29, 1960, Ser. No. 79,272
8 Claims. (Cl. 29—568)

This invention relates to a new and improved data control system for machine tools and to a tool identification means utilized in the system.

Increasing emphasis upon automation of machine tool operations has resulted in the development of at least two basic systems for controlling the transfer of tools on a single spindle machine from a storage station to a work station and back to the storage station. The simpler of these two systems provides for programming and control in accordance with the physical location of the individual tools in a tool matrix. Tools are removed from the matrix in a predetermined order, tool identification being based upon the tool position in the matrix. Consequently, there is no need for individual tool coding, the tool selection apparatus may be quite simple, and the tolerances for the matrix structure are not particularly critical. The tool holders need not carry code data or extra hardware.

This position-code control system presents three substantial disadvantages. In the first place, the machine is unable to distinguish one tool from another. Consequently, if the machine operator locates a tool incorrectly in the matrix, or if the operator is provided with tool sequence information that does not correspond to the master control data for the machining operation, substantial damage to the machine may occur. Secondly, since the machine cannot identify individual tools, except by their position in the matrix, standardization of tools is quite difficult. The machine must be programmed for tool sub-routines for each job. Moreover, intermixing of tool sequences during the last cycle of a given job, in order to facilitate change-over to the next job, becomes difficult and risky. The third disadvantage of this system pertains to tool changing. Because each tool must be replaced in the matrix in the spot from which it was removed, additional motions of the storage system or matrix are required. These auxiliary motions result in a tool changing cycle which in many cases is substantially slower than desirable.

The second basic system used heretofore provides for random storage of individually coded tools in a tool matrix or storage station. This system is inherently more sophisticated than the position-code system and results in more flexible machine operation. In this system, because each tool or toolholder is directly encoded with data identifying the tool, it is possible for the machine to recognize and locate the desired tool regardless of its position in the tool matrix. The tool changing cycle is relatively simple because it is only necessary to interchange the tool at the work station with the next required tool in the matrix. During the last cycle of a given job, the tool sequence can easily be changed for the next job while simultaneously completing the job in process. Within the limits of the ability of the machine to distinguish different tool codes, this system permits the use of standard coded tools without special sub-routines for changing tools. Checking for setup errors can be accomplished with relative convenience, as compared with the position-code system, because the tool or toolholder and its identification can be independently checked at the toolroom, by the machine operator, and by inspectors.

The random storage system, however, also presents some substantial disadvantages. In the first place, the code elements must be very accurately aligned on the toolholders, which makes the holders both complicated and costly. The mechanical tolerances required for the reading devices used in this system are very critical. Thus, the cumulative tolerances for effective code reading include the structure of the machine itself, the storage matrix location and bearings, the location of toolholder cartridges in the storage matrix, the control of auxiliary motion of either the matrix or the tool cartridges, the toolholder, and the location of the code elements on the holder. This relationship between the reading or sensing device of the system and the code elements on the toolholders results in a costly structure and reduces the permissible coding density for a given structural tolerance.

It is an object of the invention, therefore, to provide a new and improved data control system for a machine tool which effectively minimizes or eliminates the above-noted disadvantages of both position-code and random access storage systems.

A particular object of the invention is to provide a new and improved code member and code member mounting means, for a data control system in a machine tool, which combines the best features of the aforementioned position-code and random access storage systems.

A particular object of the invention is to provide for simple and reliable error checking in a data control system for a machine of the kind in which tools are automatically transferred from a tool storage station to a work station and back to the storage station.

A further object of the invention is to provide for toolroom coding of individual tools to be used in an automated machine tool without requiring the mounting of any code device or element on an individual tool or its toolholder.

An additional object of the invention is to increase the capacity of data storage, with respect to identification data for individual tools used in an automatically controlled machine, by increasing the permissible storage density, but without substantially increasing the criticality of tolerances permissible in the machine, and at the same time substantially reducing the holder cost.

Another object of the invention is to provide a new and improved memory system for controlling the replacement of a tool in a tool storage matrix after the tool has completed a working cycle.

A related object of the invention is to provide a new and improved tool identification means, suitable for use in a numerical data controlled machine tool, that inherently permits the use of any kind of data sensing apparatus in conjunction therewith.

A corollary object of the invention is to provide a new and improved data control system for a machine tool of the kind in which individual tools are automatically transferred between a tool storage station and a work storage station, which system is inherently simple and economical in construction yet highly accurate and effective in operation.

Thus, the present invention relates to a data control system for a machine of the kind comprising a tool storage station for storing a plurality of tools, a work station, and tool transfer means for transferring tools between the storage and work stations. A control system constructed in accordance with the invention comprises a plurality of individual code members each bearing code indicia identifying an individual tool. These code members may take a number of different forms; in one embodiment described hereinafter the code member is substantially similar to an ordinary key of the kind used in tumbler locks. In another embodiment, a code member essentially similar to an ordinary punched card is used. Mounting means are provided for removably mounting the code members at the tool storage station in association with the respective tools that they identify. The system includes sensing means for sensing the code indicia on the code members at the storage station; contact sensing and photoelectric sensing are described hereinafter, but other forms of sensing may be employed. Control means, coupled to the sensing means, are employed to actuate the tool transfer means to transfer preselected tools from the storage station to the work station and back to the storage station. This control means includes means for storing data identifying the tool while it is separated from its code member, thereby enabling the control means to restore each tool to a position, in the storage station, in which it is associated with the correct code member.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is a plan view of the data control system and machine tool illustrated in FIG. 1;

FIG. 3 is a perspective view of a code member used in the system of FIGS. 1 and 2;

FIG. 4 is a sectional elevation view of an individual identification device, including a code member, employed in the system of FIGS. 1 and 2;

FIG. 5 is a sectional view taken approximately along line 5—5 in FIG. 4;

FIG. 6 is a sectional end elevation view of a sensing device employed in the system of FIGS. 1 and 2;

FIG. 7 is a longitudinal sectional view of the sensing device taken approximately along line 7—7 in FIG. 6;

FIG. 8 is a block diagram of the electrical control circuits for the system of FIGS. 1 and 2;

FIG. 9 is a schematic diagram of a particular logic circuit employed in the electrical control system of FIG. 8;

FIG. 10 is an elevation view of a portion of a data control system constructed in accordance with another embodiment of the present invention;

FIG. 11 is a plan view of the embodiment of FIG. 10; and

FIG. 12 is a detail view, drawn to an enlarged scale, of a code member and retaining device used in the embodiment of FIGS. 10 and 11.

*The tool transfer apparatus*

Figure 1:
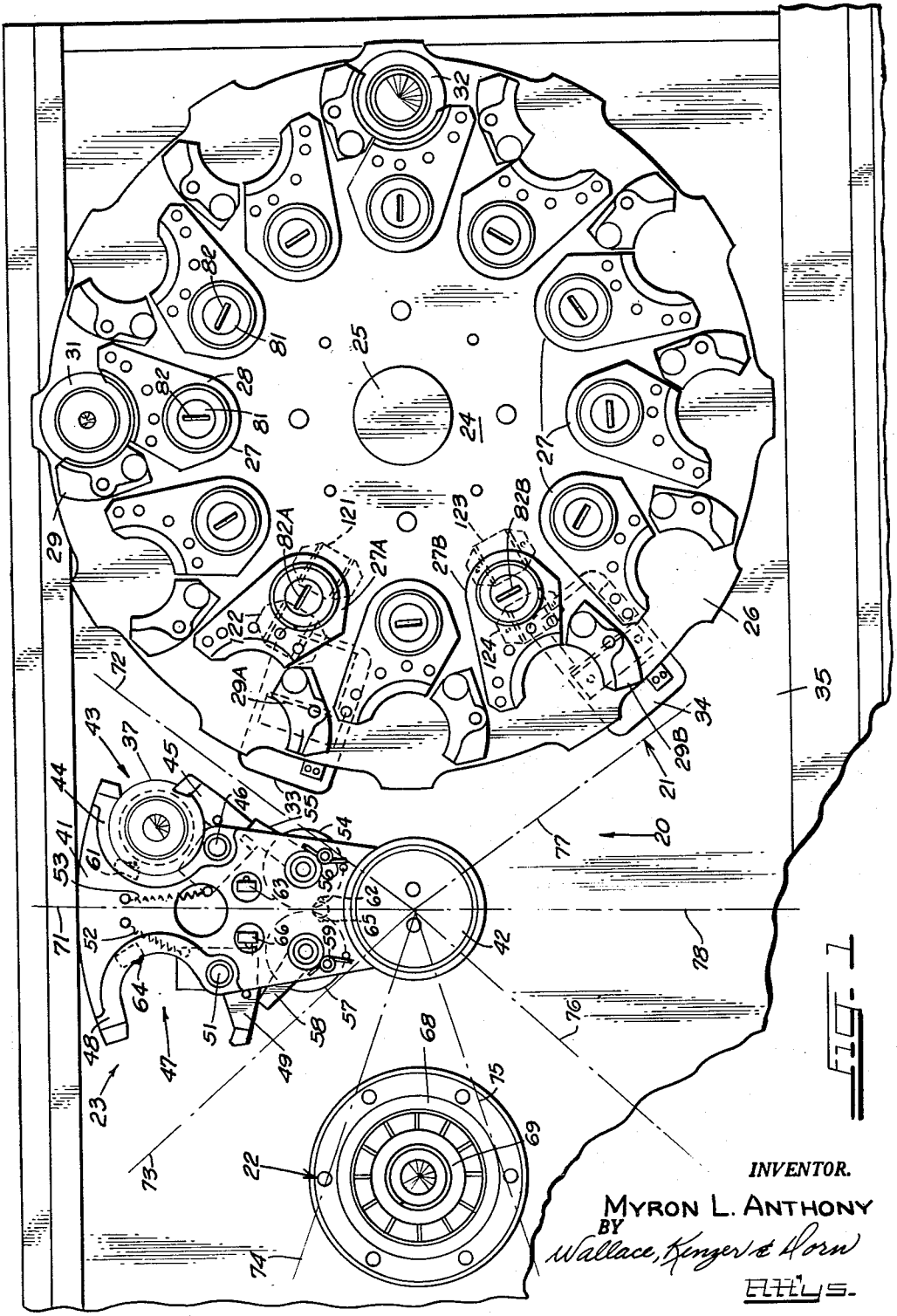
FIG. 1 is a front elevation view of the mechanical portions of the data control system for an automatic machine tool constructed in accordance with one embodiment of the present invention.

FIGS. 1 and 2 illustrate the mechanical portions of a tool transfer and data control system 20 in an automatically controlled machine tool. In general, the machine comprises a tool storage station 21, a work station 22, and tool transfer means 23 for transferring tools between the work station 22 and the storage station 21. The construction of the work station 22, the transfer mechanism 23, and the tool storage station 21 are not critical with respect to the present invention, these portions of the machine being described herein only in sufficient detail to afford a complete understanding of the data control system of the present invention. Although a variety of different transfer mechanisms and tool storage devices may be utilized in conjunction with the invention, the apparatus shown in FIGS. 1 and 2 comprises a preferred construction. The work station 22, and specifically the chuck used therein, is described, together with a preferred form of toolholder, in the co-pending application of James A. Stark, for "Machine Tool," Serial No. 43,097, filed July 15, 1960, to which reference may be had for In general, the tool storage station 21 comprises a tool matrix 24 that is mounted for rotation upon a shaft generally indicated at 25. The tool matrix 24 includes a base plate 26 upon which a plurality of individual toolholder cartridges 27 are mounted. In the illustrated construction, there are twelve of the individual toolholder cartridges 27. It should be understood, however, that any desirable number of cartridges or similar holding devices, comparable to the cartridges 27, may be included in the toolholder matrix 24, depending upon the capacity desired for the machine tool.

Each of the matrix cartridges 27 comprises a segmented tool clamp including a fixed clamp segment 28 and a movable clamp segment 29. The movable clamp segment 29 is pivotally mounted upon the base plate 26 and is actuatable between a closed position, as illustrated for most of the cartridges 27, and an open position as shown in the case of the cartridge 27A. In the closed position, and as best shown in FIG. 2, the two clamp segments 28 and 28 clamp the chuck engaging portion 30 of a toolholder 31 to hold the toolholder in mounted position in the matrix. When pivoted to the open position, as illustrated in the cartridge 27A, however, the movable clamp segment 29 releases the toolholder. Only two toolholders 31 and 32 are shown mounted in the matrix 24 in FIGS. 1 and 2; it should be understood, however, that in normal use most or all of the cartridges 27 would be utilized to mount a toolholder in the matrix.

A suitable mechanism is provided, in the storage station 21, to release the toolholders mounted in the matrix in order to permit their transfer of the work station 22. As best shown in FIG. 1, two such release mechanisms 33 and 34 are employed in the transfer system of FIGS. 1 and 2. Each of the cartridge release mechanisms 33 and 34 may be utilized to open any one of the cartridges 27, and these release mechanisms establish two transfer locations for the tool storage station 21 as described more fully hereinafter. The release mechanisms 33 and 34 are each mounted in fixed position on the frame 35 of the machine. The release devices may be solenoid actuated or may be operated by any other desired mechanism.

The transfer mechanism 23 comprises a transfer arm 41 mounted for rotation upon a shaft 42. The arm 41 carries a first clamp 43 including a fixed clamp member 44, which may be an integral part of the transfer arm, and a movable clamp member 45 that is pivotally mounted on the transfer arm by a pin 46. A toolholder 37 is shown clamped in the clamp 43. A second clamp 47 is included in the transfer arm structure and is shown in open position. This second clamp comprises a fixed clamp member 48, similar to the clamp member 44, and a movable clamp member 49 that is pivotally mounted upon a pin 51. The clamp member 49 is held in its open position by suitable means such as a spring 52. A similar spring 53 is provided to bias the movable member 45 of the clamp 43 toward its open or released position.

The transfer mechanism 23 further includes means, mounted on the transfer arm 41, for latching the clamps 43 and 47 in closed position. With respect to the clamp 43, this means comprises a rotary solenoid 54 that is mounted on the transfer arm 41 and which is provided with a rotary armature member 55 engaging the movable clamp member 45. A spring 56 biases the armature 55 toward movement in a counterclockwise direction; normally, the solenoid is energized so that the spring does not move the armature. When the solenoid is de-energized, however, the spring 56 moves the armature 55 to latching position to hold the clamp 43 closed. A similar rotary solenoid 57 having an armature 58 engaging the clamp member 49, is provided on the opposite side of the transfer arm. A biasing and holding spring 59 is employed to hold the solenoid 57 in latched position as explained hereinafter.

There are three sensing switches included in the transfer mechanism 23 in association with the first clamp 43. A first sensing switch 61 (see FIG. 1) is used to afford a positive indication of whether a toolholder is disposed within the clamp or jaw 43. A second sensing switch 62 affords a positive indication that the movable jaw member 45 is latched in position to engage a toolholder. A third sensing switch 63 is used to afford a positive indication that the movable clamp member 45 is in fully open or released position. Three similar sensing switches 64, 65 and 66 are used to determine the operating condition of the second transfer clamp 47, being mounted in positions corresponding to switches 61, 62 and 63 respectively.

The work station 22 of the machine illustrated in FIGS. 1 and 2 may be generally conventional in construction. This portion of the system 20 comprises a chuck 68, mounted on a suitable spindle, for mounting a toolholder in working position. A toolholder 69 is shown mounted in the chuck in FIGS. 1 and 2. Means are provided for rotating the spindle and chuck 68 and for moving the chuck axially, in the course of a machining operation, as indicated by the arrows A in FIG. 2. Inasmuch as the mechanism for advancing and retracting the chuck 68 and for driving the chuck and spindle rotationally, during a machining operation, may be conventional and does not comprise a part of the present invention, the details of this mechanism are not illustrated in the drawings. Movement of the chuck is not required during a tool changing operation.

Before considering the data control system and tool identification means of the present invention, a basic understanding of the operation of the tool transfer mechanism described hereinabove in connection with FIGS. 1 and 2 is desirable. In considering the operation of the system, it may first be assumed that the transfer arm 41 is located in the position shown in FIG. 1 but with both of the jaws 43 and 47 open. Furthermore, it may be assumed that a toolholder is clamped in the cartridge 27A located at the first transfer location of the storage station 21 in alignment with the release mechanism 33, and that this particular tool is the one desired for use during the next operating cycle of the machine. Under these conditions, the transfer arm 41 is rotated in a clockwise direction to bring the open jaw 43 into alignment with the toolholder mounted in the receptacle 27A. The position of the transfer arm 41, at this time, is generally indicated by the dash line 72, indicating a first transfer position for the transfer arm 41, the initial position of the transfer arm being indicated by the corresponding dash line 71.

When the transfer arm 41 moves to the transfer position 72, as described hereinabove, the clamp member 45 is pivoted in a counterclockwise direction about the pin 46 by engagement with the toolholder. Furthermore, the sensing switch 61 is actuated to indicate the presence of a toolholder in the jaw 43, and actuation of this switch is effective to de-energize the solenoid 54. The spring 56 moves the armature 55 into latching position, as shown in FIG. 1, so that the toolholder is gripped in the jaw 43 in the position illustrated for toolholder 37. The switch 62 is actuated upon movement of the armature 55 to latched position. Thereafter, the release mechanism 33 is actuated to open the movable clamp member 29A of the cartridge 27A, releasing the toolholder so that it can be moved out of the cartridge by the transfer arm. The transfer arm 41 then pivots in a counterclockwise direction to a third or storage position generally indicated by the dash line 73. Of course, the position 73 may be made coincident with the initial position 71, but the described arrangement is usually preferred because it avoids ambiguity with respect to the starting and storage positions in the transfer operation.

After a toolholder, such is the toolholder 37, has been picked up from the tool matrix 24, and after the transfer arm has moved to the storage position 73, it may be held in that position for some period of time pending completion of a machining operation already in process. When the new tool held in the jaw 43 is to be mounted in the work station 22, the chuck 68 is first retracted from its working position and spindle rotation is interrupted. The transfer arm 41 is then pivoted further in a counterclockwise direction to the transfer position 74, at which position the other clamp 47 on the transfer arm engages the toolholder 69 already present in the chuck 68. When the clamp has engaged this toolholder, as sensed by the switches 64 and 65, the chuck is actuated to release the toolholder, after which the transfer arm 41 moves to its next operating position, as indicated by the dash line 75, taking the toolholder from the chuck with it. With the transfer arm in the position indicated by the dash line 75, the toolholder held in the clamp 43 is aligned with the chuck, and the chuck is actuated to engage this toolholder. When this is accomplished, the jaw 43 is released by actuating the rotary solenoid 54 to pivot the armature 55 out of engagement with the movable jaw member 45. The spring 53 opens the jaw, releasing the toolholder, which is now held in the chuck 68.

After the new tool has been mounted in the chuck 68, as described above, the transfer arm 41 is rotated further in a counterclockwise direction to the position indicated by the dash line 76. The transfer arm is held in the position 76, which is a storage position similar to position 73, until the control system determines which cartridge 27 is to receive the old tool. When this determination has been made, the arm 41 is again rotated counterclockwise, bringing the old tool held in the jaw 47 into alignment with a toolholder cartridge 27B, as indicated by position line 77, at the second transfer position of the matrix 24, generally indicated by the location of the release mechanism 34. The cartridge 27B, and specifically the movable clamp member 29B, is actuated to grip the tool, once it has been brought into mounting position relative to the cartridge 27B. Thereafter, the jaw 47 is released by actuation of the solenoid 57, being returned to its open condition by the biasing effect of the spring 52. At this point, the two jaws of the transfer mechanism 23 are both empty and both open and the transfer arm 41 is moved to a waiting position generally indicated by the dash line 78 and corresponding to the initial position 71 but rotated 180° relative thereto.

In the next tool changing cycle, the same operations take place except in reverse. The transfer arm 41 is first moved counterclockwise from position 78 to position 77 to pick up a tool from a tool cartridge at the position of the cartridge 27B in FIG. 1. In this instance, the tool is grasped in the jaw 47 of the transfer mechanism. With the toolholder clamped in the jaw 47, the cartridge at the transfer location indicated by cartridge 27B is released, after which the transfer moves to the storage position 76. The transfer arm waits in the position 76 until a tool change is required, at which time it moves to the position 75 to pick up the tool presently in the chuck 68 at the work station 22. After picking up the old tool, the transfer arm 41 moves to the transfer position 74 to deposit the new tool in the work station. Thereafter, the transfer arm rotates in a clockwise direction to its position 72 to replace the tool that has already been used in the matrix 24. When this operation is completed, the transfer arm moves to the initial position 71 and waits at that position until it is again necessary to pick up a new tool.

The tool identification means

In the operation of the transfer system described hereinabove, it is necessary to provide a means for identifying the tools or toolholders to be removed from the matrix 24 at the storage station 21. It is also necessary to provide some means for identifying the position at which a tool that has already been used is to be deposited in the tool storage station. This is a principal aspect of the system 20 with which the present invention is concerned.

In addition to the clamping apparatus comprising the clamp members 28 and 29, each of the toolholder cartridges 27 of the tool matrix 24 is provided with an individual code member holder 81. The construction of an individual code member holder 81 and of a code member 82 employed in conjunction therewith are shown in FIGS. 3–5. As best shown in FIGS. 3 and 4, the code member 82 employed in this embodiment of the invention is essentially similar to a key of the kind used in conventional tumbler locks. The key 82 is provided with a longitudinal crimped portion 83 affording a longitudinal guide to orient the key in the key holder 81. A pair of guide lugs 84 may be provided at one end of the key adjacent a handle portion 85. The two edges of the key are encoded, in accordance with a predetermined binary code, by means of individual code lugs 86. In the illustrated construction, there are a total of eight code lug positions along each edge of the key 82, affording a total of sixteen different bits of information in a binary code. This affords a total potential of 65,536 code combinations. Thus, the code member 82 affords a high density coding device, making it possible and practical to utilize a large number of tools in the system.

The key holder 81, as best illustrated in FIGS. 4 and 5, comprises a key housing 87. The key housing 87 is affixed to a mounting member 88 (FIG. 4) by suitable means, such as a plurality of screws 89. The mounting member 88, in turn, is secured to the matrix mounting plate 26 as by a plurality of screws 91. The housing 87 is provided with a longitudinal bore 92 within which a tumbler 93 is mounted. The tumbler is held in the housing by suitable means such as a washer 94 and a retaining ring 95. Preferably, means are provided for limiting rotational movement of the tumbler, and may include a pin 96 mounted in the housing 87 in position to engage a suitable stop element in the outer or front portion 97 of the tumbler 93. Inasmuch as the means used to control rotational movement of the tumbler within the housing may be conventional and is not critical to the present invention, this means has not been illustrated in detail in the drawings. A suitable set screw or other guide member 98 may be mounted in the tumbler 93 in position to engage the offset guide portion 83 of the key 82, limiting the possibility of insertion of the key into the tumbler to only one fixed orientation.

The tumbler 93 is provided with a longitudinal slot 101 for receiving the key 82. The housing 87 is provided with a similar longitudinal key-receiving slot 102 and with a plurality of angular slots 103 and 104 for receiving the individual lugs 84 and 86. A first contact member 105 is affixed to the housing 87 by suitable means such as a plurality of screws 106. The contact member 105 includes a plurality of contact fingers 107 which normally project into the slots 103 in the housing 87 as indicated by the finger 107A in the slot 103A in FIG. 4. A second contact member 108 is secured to the housing 87 by suitable means such as a plurality of screws 109 (see FIG. 5). The contact member 108 includes a plurality of individual contact fingers 111 which project into the code slots 104 on the opposite side of the housing. When the key 82 is inserted in the key holder 81, it is inserted with the key aligned in a horizontal direction, as seen in FIG. 5, and the key is then turned 90° in a clockwise direction to the position illustrated in FIG. 5. When this is done, those contact fingers 107 and 111 which are engaged by one of the lugs 86 are pushed outwardly from the housing 87 to the position illustrated for the contact finger 107 in FIG. 5. The contact fingers 107 and 111 which are not engaged by one of the lugs 86 remain in their normal or depressed position and project only slightly outwardly of the housing 87, as shown by the contact finger 111 in FIG. 5.

As noted hereinabove, each of the toolholder cartridges 27 (FIG. 1) is provided with a holder 81 for a code member such as one of the keys 82. The keys 82 may be fabricated simply and inexpensively, using an ordinary key punch, to afford a high density code member identifying one of thousands of tools. Code members are fabricated at the toolroom, preferably at the same time that the tool for a given part of a job is set up in its toolholder, and may subsequently be checked by the toolroom operator, the machine operator, and by inspectors. To set up the matrix 24 for a given job, all of the tools, mounted in their respective toolholders and each accompanied by the required code member 82, are delivered to the machine operator. Each tool is then loaded into one of the cartridges 27 and the corresponding code member 82 is inserted in the holder 81 associated with the matrix position at which the tool is mounted. It is not necessary for the machine operator to locate specific tools at any given cartridge position in the matrix 24, since the individual code keys 82 afford full identification of the tool mounted at any matrix position.

The system 20 illustrated in FIG. 1 includes a pair of sensing devices 121 and 122 for reading the code data on each code member 82 whenever that code member is brought into the position indicated by the code member 82A. A similar pair of sensing devices 123 and 124 are provided for reading a code member 82B at the other transfer position of the storage matrix 24. The sensing devices 121–124 are essentially similar to each other and are mounted upon the frame 35 of the machine in position to engage the contact fingers of the code units 81 as the latter are brought to the transfer positions; the sensing unit 121 is shown in detail in FIGS. 6 and 7.

The sensing unit 121, as illustrated in FIGS. 6 and 7, comprises a housing 126 having a pair of mounting blocks 127 and 128 affixed thereto. The housing is secured to the frame member 35 by suitable means such as the screws 129. A plurality of electrically conductive sensing elements or brushes 131 are mounted within the housing 126 between the mounting blocks 127 and 128, being supported therein by means of a plurality of insulating spacers 132. The spacers 132 are supported upon a pair of mounting bolts 133. Individual electrical connections are provided to the sensing brushes 131, being generally indicated by a connecting cable 134. The relative positions of the key holder 81 and the sensing unit 121 are illustrated in FIGS. 6 and 7; as indicated therein, the brushes 131 engage the periphery of the key holder and specifically the individual contact elements 107 thereof. The number of sensing elements 131 corresponds to the number of contact elements 107 on one side of the code unit 81. The second sensing unit 122 at the transfer station of the matrix (see FIG. 1) is used to sense the contact elements 111 on the opposite side of the key unit. It is thus seen that the sensing devices 121–124 are effective to sense the complete identification data carried by each of the two code members 82A and 82B instantaneously located at the two transfer positions of the tool storage matrix 24.

*The electrical control system*

FIG. 8 illustrates an electrical control system 150 which utilizes the tool identification means described hereinabove to control operation of the tool transfer system 20 of FIGS. 1 and 2. The electrical control system 150 includes a data input device 151 having a master control switch 152 connected thereto. The data input device 151 may comprise a conventional tape reader for reading data from a punched tape 160, this being the most popular form of data input apparatus for machine tool operations at the present time. On the other hand, the device 151 could also comprise a magnetic tape reading device or any other form of interpretation apparatus for reading and interpreting pre-recorded machine control data.

The data input device 151 is coupled to a storage unit 153. The storage unit 153 may comprise a conventional magnetic core memory device or other electrical storage apparatus for storing code data identifying tools employed in a given operation. Perhaps the simplest form of memory unit which may be employed as the device 153 is a bank of relays, including one relay for each potential code position on a given one of the code members 82. Thus, the storage device 153 may include simply a total of sixteen individual relays, one relay for each of the sixteen possible positions of the code lugs 86 on each of the keys 82 (see FIG. 3).

The storage device 153 is electrically connected to a comparator 154. The comparator 154 is also coupled to the upper sensing unit or reader comprising the sensing devices 121 and 122 (see FIG. 1) and to the lower reader or sensing unit comprising the sensing devices 123 and 124. The comparator 154 may comprise any suitable apparatus for comparing data from the sensing devices with data from the storage apparatus 153. A preferred form of logical circuit which may be employed for this purpose is described hereinafter in connection with FIG. 9. The comparator 154 includes an output stage which is electrically coupled to a master sub-routine control apparatus 155. The control system 150 includes a stepping drive 152 that is mechanically connected to the tool matrix 24 by means of the shaft 25. The stepping drive 152 is electrically controlled and actuated by the master control apparatus 155. It includes suitable apparatus for rotating the matrix 24 to bring successive ones of the cartridges 27 to the two transfer locations occupied by the cartridges 27A and 27B in FIG. 1. In operation, the drive mechanism 152 rotates the tool matrix one position at a time, leaving the matrix in each successive position long enough for sensing and interpretation of the code data on the code members as described hereinafter.

The master sub-routine control apparatus 155 may comprise a plurality of control switches which are mechanically connected to the transfer arm 41 and which are actuated in accordance with the rotational position of the transfer arm. A substantial number of rotary control switches are required, since the control apparatus 155 is provided with operating circuits which control energization of the upper and lower release mechanisms 33 and 34, the rotary solenoid jaw release devices 54 and 57 and the drive mechanism 156 which rotates the transfer arm 41. In addition, the control apparatus 155 provides suitable energizing circuits for the retracting mechanism 157 of the spindle chuck 68. Moreover, an electrical connection is provided to the sub-routine control apparatus 155 from the data input device 151 to control the sub-routine operations of the system 150 in accordance with recorded data on the tape. In the following description, the sensing switches 61–66 of the transfer mechanism 23 (see FIG. 1) are treated as a part of the master sub-routine control apparatus 155, since they are interconnected in the control circuits provided by the master control apparatus.

To place the control system 150 of FIG. 8 in operation, a master control switch such as the switch 152 is energized, starting the tape reader or other data input device 151 in operation. The tape reader may be utilized to control a number of machine operations; for example, it may be connected to the rotating drive apparatus 159 to control rotation of the spindle and the chuck 68. For a tool transfer cycle, predetermined data is recorded on the record medium 160 interpreted by the input device 151, and this data is supplied to and stored in the storage device 153 to afford a basis for selecting a tool to be transferred from the storage station 21 and to the work station 22. As noted hereinabove, this storage operation may comprise the setting of a plurality of relays equal in number to the total number of recording positions on each code member 82. Assuming that the transfer arm 41 is in a generally vertical position, as illustrated in FIG. 1, but with both jaws open and empty, the master sub-routine control apparatus 155 conditions the upper reader 121, 122 for a reading operation. At the same time, the energizing circuits for the lower reader 123, 124 are effectively opened. The control apparatus 155 effectively "recognizes" that the upper reader 121, 122 should be used instead of the lower reader 123, 124 because of the position of the transfer arm 41, the control apparatus being mechanically connected thereto. Furthermore, the control apparatus 155 is able to determine that the transfer arm is presently located at the initial position 71, due to the same mechanical connection. After the new tool data is recorded in the memory 153, the control apparatus 155 is actuated by a signal from the data input device 151 and energizes the stepping drive 152. The drive 152 rotates the tool matrix 24 to bring the toolholder cartridges, in succession, into the transfer location where the data on the associated code member can be read by the upper reader 121, 122.

As each toolholder cartridge reaches the transfer position, it is held in that position for a short interval, during which time the data from the code member accompanying the cartridge is compared with the data stored in the memory unit 153, this operation being effected in the comparator 154. If the recorded data and the sensed data from the reader 121, 122 are not identical, the stepping drive continues rotation of the tool matrix to bring the next tool holder cartridge into the transfer location for reading. Several such comparison operations may be required, but these are usually accomplished while a machining operation is being carried out, so that there is plenty of time for a number of comparisons without slowing down operation of the machine tool.

When the sensing signals from the upper reader 121, 122 are found to match the data recorded in the storage device 153, the comparator 154 actuates the control apparatus 155 to stop the stepping drive 152. The electrical signal applied to the control apparatus 155 to interrupt operation of the tool matrix drive also initiates a second sub-routine for transferring a tool from the storage matrix 24 to the transfer arm 41. That is, the initial transfer cycle, described in detail hereinbefore, is now effected under control of the apparatus 155. Thus, the master sub-routine control apparatus first energizes the transfer drive 156 to rotate the arm 41 in a clockwise direction to its transfer postion 72 (FIG. 1). Once this position is reached, as determined by the angular orientation of the transfer arm 41 and by actuation of the sensing switch 62 on the transfer arm, the apparatus 155 controls actuation of the jaw latch 54 and the release mechanism 33 as described hereinbefore. When the selected toolholder is grasped by the transfer arm and the cartridge on the matrix has been released by the mechanism 33, the transfer arm moves to the interim storage position 73, at which point the initial tool transfer sub-routine is completed and the apparatus 155 holds the transfer mechanism in a waiting position.

The next sub-routine is initiated by interruption of a current machining cycle, under control of the data input device 151, which stops the spindle drive 159. When the rotational movement of the spindle is interrupted and the chuck is located in its transfer position, this change in operating condition is signalled to the sub-routine control apparatus 155 by means of a suitable mechanical or electrical connection to the control apparatus from the drive 159 or the spindle for the chuck 68. Thus, a suitable sensing switch or switches associated with the chuck and spindle may be utilized to actuate a second sub-routine, in the control apparatus 155, as soon as the spindle drive has been stopped and the chuck has been retracted to the transfer position illustrated in FIG. 2.

In the course of the second sub-routine controlled by the apparatus 155, the transfer arm 41 is first driven from the interim storage position 73 to the pickup position 74, the jaw 47 is actuated to engage a tool present in the chuck 68 (FIG. 1), and the chuck is actuated, by a drive 157, to release the old tool. Completion of this operation is determined by actuation of the sensing switches on the transfer arm, as described hereinabove, and by a suitable sensing switch or similar device in the chuck actuator 157. Thus, the sub-routine control apparatus 155 is automatically conditioned to continue movement of the transfer arm to the next position 75 to deposit a tool in the chuck. The chuck actuator 157 is actuated to cause the chuck to grip the new tool and the transfer arm jaw latch solenoid 57 is then released, under the control of the apparatus 155. Completion of this operation is recognized by actuation of the sensing switch 63 (FIG. 1) which conditions the sub-routine control apparatus 155 to complete the second sub-routine by moving the transfer arm 41 to the second interim storage position 76.

In the control system 150 as described thus far, there is no separate storage apparatus, independent of the data input device 151, for recording the identification of a tool once it has been removed from the matrix 24. However, the identification of a tool may be recorded on the master record tape 160 for the data input device 151 in two instances, there being one recordation of the tool identity for initiating a tool transfer and a second recording of the same data to control replacement of the tool. Thus, with the old tool held in the storage position 76, the data input device 151 may be energized by a signal from control apparatus 155 to continue its operation, in the course of which data identifying the tool originally located in the chuck 68 is supplied to the storage unit 153. The stepping drive 152 is then actuated to rotate the storage matrix 24 once more. In this instance, however, the sub-routine control apparatus 155 renders the lower reading or sensing unit 123, 124 effective to sense and interpret data from the code members 82 mounted in the holding devices 81 of the matrix 24. The "old tool" data now stored in the memory unit 153 is compared with the data sensed by the lower sensing unit, in the circuit 154, until identity is recognized, at which point the stepping drive 152 is again stopped. At the same time, a signal is applied from the comparator 154 to the control apparatus 155 to initiate a further transfer sub-routine in which the old tool is replaced in the matrix.

In the course of the subsequent sub-routine controlled by the apparatus 155, the transfer arm 41 is actuated to rotate further in a counterclockwise direction to the position 77 (FIG. 1). As the transfer arm reaches this position, the toolholder held by the transfer arm is snapped into a cartridge at the second transfer location of the matrix. A suitable sensing switch may be located at this position to determine when the toolholder is properly mounted in the matrix, and this sensing switch may be made a part of the control apparatus 155. When this operation is completed, the control apparatus 155 actuates the jaw latch solenoid 57 to release the clamp on the transfer arm, completion of the releasing action being signalled by actuation of the sensing switch 66 on the transfer arm. Thereafter, the control apparatus 155 again actuates the transfer drive 156 to rotate the arm 41 clockwise to its second starting position 78, at which point the control apparatus 155 awaits initiation of a new tool change cycle in response to the operation of the data input device 151.

Subsequently, the recorded data fed to the data input device 151, in a form of the punched tape 160 or the like, may signal the need for a new tool from the matrix 24. This input data will usually appear during a machining cycle in order to enable a tool to be selected and transferred to the intermediate storage position 76 while the preceding machining step is being accomplished. That is, the initial sub-routines, in which a tool is selected and removed from the matrix 24, are carried out while the preceding tool is still in use. The tool transfer operation in this instance proceeds in exactly the same manner as before except that the initial selection is accomplished on the basis of data sensed by the lower reader or sensing unit 123, 124 because the transfer arm is starting from the position 78. When the tool has been selected and grasped in the clamp 47 of the transfer arm, it is moved to the storage position 76 and held there until the tool exchange sub-routine is initiated in response to retraction of the chuck and interruption of the spindle drive. The transfer sub-routine proceeds in the same manner as before, except that the sequence of positions is 76–73 instead of 73–76. Finally, the replacement sub-routines are again carried out. The correct location for the old tool is identified, and the tool is replaced, the transfer arm 41 going from position 73 to position 72 and ultimately to position 71.

From the foregoing description, it will be apparent that the tool identification means and control system of the present invention makes it possible to encode a very large number of tools individually and in a manner which precludes normal errors in mouting of the tools in the tool matrix. That is, tool identification is entirely independent of the positions in which the tools are mounted in the tool matrix 24. The individual toolholders are easily kept in association with their identifying code members 82. It is necessary to record the tool data twice on the recording medium 160 which controls the data input device 151, but this is not particularly difficult and merely requires one additional data item in the punched tape or the like fed to the device 151. The code members can be recorded with relatively high density data, since the only critical tolerances involved in the sensing operation are the locations of the code member holders 81 on the matrix 24 and of the sensing devices 121–124 on the frame of the machine. That is, the toolholders, the transfer mechanism, and the other elements of the transfer system do not enter into the tool indentification portion of the system. The transfer operation is broken down into individual sub-routines having to do with tool selection, removal of a tool from the storage matrix, tool exchange, old tool identification, and tool replacement (in the matrix). Accordingly, the control apparatus 155 can be permanently programmed and may be constructed in a form of a plurality of cam-controlled switches, rotary band switches, or the like. This arrangement is considerably more economical and reliable where individual transfer routines must be prepared to suit the requirements of a position-code system.

In some instances it may be desirable to eliminate the necessity for recording data to be fed to the input device 151 to control replacement of tools following use. This can be accomplished by adding a further storage unit 161 to the control system 150 and by coupling this storage unit to the storage unit 153 and to the comparator 154 as well as to the sub-routine control apparatus 155. The storage unit 161 may be of any suitable kind, such as a magnetic core storage unit or a relay storage device as described above for the unit 153. With this modification, each time the comparator 154 determines that a new tool has been accurately identified, the selection data recorded in the storage unit 153 is recorded in the storage unit 161 and is cleared from the original storage device. This storage data is held in the storage memory unit 161 until the tool transfer sub-routine is completed and is then utilized to control replacement of the old tool in the matrix 24. In all other respects, this modification of the system operates as described above.

FIG. 9 illustrates a logical device which may be utilized as one stage of the comparator 154, there being as many stages included in the comparator as there are individual binary positions in the selected code. That is, in the system as described hereinabove, there would be sixteen stages corresponding to that of FIG. 9 in the comparator 154, since there are sixteen data positions on each of the code members 82.

The logical device of FIG. 9 includes an A.C. signal source 171 connected to one terminal 172 of a switch 153B which may be considered to comprise the contacts of one relay in the storage unit 153. The switch 153B is provided with a second terminal 173, which, in this instance, is grounded, the common terminal 174 of the switch being connected to one end of the secondary winding 175 of a transformer 176. The other terminal of the transformer winding 175 is connected to the base electrode 177 of a transistor 178.

The transformer 176 also includes a primary winding 179 which is connected back to the A.C. source 171 through a circuit for the transformer winding 179 may include a limiting resistor 182, although this is not essential. The other end of the winding 179 is connected to a sensing switch 131B having one open-circuited terminal 183 and a grounded terminal 107B. Thus, the switch 131B represents one of the sensing brushes 131, which is normally open-circuited but which is returned to ground when it engages one of the contact elements 107 (or 111) on one of the key holders 81.

The transistor 178 is connected in a detector circuit. The emitter electrode 185 is returned to ground through a resistor 186. The collector electrode 187 is connected to a suitable D.C. supply designated as E— in a circuit which includes the operating coil 188 of a relay 189. The relay 189 includes one or more sets of contacts 191 which are connected to the master control apparatus 155 of the system illustrated in FIG. 8.

The logical device illustrated in FIG. 9 is essentially similar to that described and claimed in the co-pending application of Myron L. Anthony, Serial No. 23,071, filed April 18, 1960. When the two switches 153B and 131B are both in the operating position identified by the legend "space" in FIG. 9, no signal of substantial amplitude is supplied to the detector transistor 178. Consequently, the transistor is maintained in its normal non-conductive operating condition, so that no substantial output operating current flows through the relay coil 188. On the other hand, if both of the switches 131B and 153B are actuated to their "mark" positions, A.C. signals of substantial amplitude are applied to both of the windings of the transformer 186. The induced signal in the secondary winding 175, however, is approximately equal in amplitude to the signal applied directly thereto through the switch 153B but is in phase opposition, so that the two signals in the secondary winding effectively cancel each other. No more than a negligible signal is supplied to the detector 178, under these conditions, so that the transistor remains non-conductive.

On the other hand, if one of the switches 131B and 153B is actuated to its "mark" position and the other stays at its "space" position, a signal of substantial amplitude is supplied to the base electrode of the transistor 178 through the secondary winding 175 of the coupling transformer. This is true regardless of which of the two control switches is in the "space" condition and which is in the "mark" condition, the only difference being in the phase of the signal applied to the detector transistor. Since the transistor is connected in an amplitude detector circuit, there is no effective difference insofar as operation is concerned. Either of these two conditions, which indicate a lack of correspondence between the recorded data in the memory unit 153 and the data on the code member being sensed, cause the detector to be actuated, the transistor being rendered conductive on alternate half cycles of the applied signals. Thus, the relay 189 is energized whenever there is any lack of correspondence in the interpreted data, thus making it possible to obtain an accurate and instantaneous comparison of the data identifying a new tool, as stored in the memory unit 153, and the sensed data from the code members 82. Of course, a suitable safety arrangement should be provided to limit operation of the comparator to those periods in which a code member is actually in position for sensing.

*Code member as intermediate storage*

In the foregoing description, two different arrangements are described which provide intermediate storage of data identifying the tool which has been removed from the store station 21 (FIG. 1) to the work station 22, this data storage being necessary in order to permit accurate replacement of the tool in the tool cartridge from which it was originally removed and in association with the correct code member that identifies the tool. In the first arrangement, the requisite identification data was incorporated in the master record 160 controlling operation of the data input device 151 (FIG. 8). In the second arrangement, the separate "old tool" storage or memory unit 161 was incorporated in the system to perform this function. FIGS. 10–12 illustrate a modification of the system of the invention which utilizes a slightly different form of code member and in which the code member itself is utilized as a storage device to enable the system to remember just what tool is presently located at the work station of the system. To a substantial extent, the mechanical aspects of the system are the same for the modification of FIGS. 10–12, and corresponding reference numerals are consequently employed.

In the embodiment of FIGS. 10–12, tool storage matrix 24 is again used for the storage station 21 of the system. Thus, the storage matrix includes a plurality of toolholder cartridges 27, one of the cartridges 27A being shown at the upper transfer location for the tool storage station. A tool holder 201 is shown in mounted position in the toolholder cartridge 27A. It will be understood that, in this embodiment, there is a second transfer location for the tool matrix and that this is located at the same position as the cartridge 27B in FIG. 1.

The transfer mechanism 23 in this embodiment is also essentially the same as that described hereinabove. Thus, the transfer mechanism again includes the transfer arm 41 having two clamp or jaw assemblies 43 and 47 complete with the sensing switches and latching means described in connection with FIG. 1. Furthermore, the operating cycles and sub-routines for the transfer operation remain essentially the same as described hereinabove.

In the embodiment of FIGS. 10–12, however, a different form of code member is utilized. In this instance, each toolholder and tool combination is identified by a code member 202 which comprises, essentially, a card punched or otherwise marked with code data. The code members 202 could be formed of relatively heavy paper stock punched in essentially the same manner as the punched record cards used in tabulating machines and the like. On the other hand, if the code members are to be utilized a relatively large number of times and if the code identification setup for the tools is to be semi-permanent in nature, the identification members 202 may be fabricated from relatively thin sheet metal for greater durability. Preferably, thin sheet steel is used. The code member 202 is shown in substantial detail in FIG. 12, and is provided with a total of sixteen different data locations arranged in two rows of eight locations each, providing the same storage capacity as the code member 82 shown in FIG. 3. On the other hand, a code system utilizing a greater or lesser number of code positions may be adopted if desired, and the locations of the code positions on the code member 202 may also be modified as desired.

A relatively simple card holder 203 is provided, on the matrix 24, at each of the tool positions determined by the locations of the toolholder cartridges 27. In the illustrated construction of FIGS. 10–12, the card holders 203 are simple friction-grip devices, although it may be desirable to afford a more positive card-gripping device such as a releasable latch. Each of the card holders 203 is constructed to leave an end portion 204 of the code member 202 exposed for engagement by a gripping device as described hereinafter. The surface of the card holder 203 behind the code apertures 205 in the code members 204 may be made substantially non-reflecting, whereas the code members themselves may have a relatively light colored or partially reflected surface. With this arrangement and with code markings in the form of punched holes, a conventional photoelectric sensing unit may be employed for sensing the data on the record cards. Since sensing devices of this kind are well known for use in connection with tabulating cards and other business record cards, the sensing unit in this instance is indicated only generally in the drawing, being identified by the reference numeral 206. Of course, a second sensing unit would be necessary at the other transfer location for the system.

A pair of card picker devices 208 and 209 are mounted on the transformer 21 for movement therewith and are aligned with the end portions 204 of the code members 202. Each of the card pickers 208 and 209 may comprise a relatively simple clip for gripping the end portion of the code cards, together with means for releasing the clip. Alternatively, if a magnetic metal such as sheet steel is used for the code members, each of the devices 208 and 209 may comprise a relatively small electromagnet which is adapted to engage the code member in a complete magnetic circuit to permit the card picker to remove the code member from its holder 203.

As best shown in FIG. 10, the modified embodiment further includes a code member holding device 211 which is located at the interim storage position 73 of the transfer arm 41 in position to engage a card or code member 202 held by the picker 208. If the code member is formed from sheet steel, the holding device 211 may also comprise an electromagnet capable of holding the code member by magnetic attraction. On the other hand, if some other material is used for the code members, a mechanical gripper may be employed. Where mechanical devices are utilized for the holding device 211 and the pickers 208 and 209, it is essentially necessary to provide suitable means for releasing the grip of each of these devices on the code member. Furthermore, a second holding device corresponding to the device 211 is also required in the system of FIGS. 10–12 and is located at the second interim storage position 76 for the transfer mechanism (see FIG. 1).

In the operation of the apparatus of FIGS. 10–12, the tool change cycle is initiated in the same manner as described hereinabove by rotating the tool matrix 24. As the matrix rotates, the data on each of the code members 202 is sensed by the sensing unit 206 as the tool holder cartridge with which the code member is associated reaches the transfer location corresponding to the position of the cartridge 27A in FIG. 10. As noted hereinabove, this sensing operation can be effected by a suitable photoelectric device or may be accomplished by physical contact sensing as in the system of FIGS. 3–7. When the desired tool is identified, the transfer arm 41 rotates in a clockwise direction to pick up the toolholder, such as the toolholder 201. In this regard, the system operates as described hereinabove.

When the tool holder is picked up, however, the corresponding code member 202 is also picked up. That is, the picker device 208 engages the end 204 of the code member 202, either physically or magnetically, with the result that the code member is removed from its holder 203 when the transfer arm 41 moves away from the storage matrix 24 with the new tool. When the transfer arm reaches the interim storage position 73, however, the code member 202 is engaged and held by the holding device 211. Thus, when the second sub-routine of the transfer mechanism is initiated, swinging the transfer arm from the storage position 73 toward the transfer position 74, the code member 202 is left behind in the holding device 211. Furthermore, the code member 202 remains in the holding device 211 as long as the tool it identifies is in use.

From the foregoing description of the transfer system, it will be apparent that a tool removed from the storage matrix at the upper transfer location 27A is always restored to the matrix at the same transfer location. Thus, in the next tool transfer cycle, the tool corresponding to the code member held by the holding device 211 is picked up by the transfer arm, from the work station 22, and moved to the storage position 73 of the transfer mechanism. At this time, the picker or transfer device 208 again engages the code member and retrieves it from the holding device 211. Subsequently, when the toolholder 201 is restored to the storage matrix 24, the code member 202 corresponding thereto is also replaced in its holder 203.

Thus, it is seen that the embodiment of FIGS. 10–12 eliminates any need for storage of the data identifying the tool presently located in the operating station 22 by utilizing the code member that identifies that tool as a separate storage element. That is, the requisite means for storing the data identifying the toolholder and tool comprises the code member itself and the transfer mechanism for transferring the code member to an interim storage position at the holding device 211. Of course, the other code member transfer or picker device 209 operates in conjunction with a second similar holding device to perform the same function on the opposite side of the transfer mechanism.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A data control system for a machine of the kind comprising a tool storage station for storing a plurality of tools, a work station, and tool transfer means for transferring tools between said stations, comprising:

a plurality of individual code members, each bearing code indicia identifying an individual tool means for releasably and detachably mounting said code members at said storage station in association with but separate from the respective storage positions of the tools they identify;

control means for actuating said transfer means to transfer a preselected tool from said storage station to said work station and back to said storage station, said control means including means for sensing the code indicia on said code members;

and means, included in said control means, for restoring each tool to its original position in said tool storage station in association with its identifying code member, the last said means comprising means for effectively storing the identity of the tool while separated from its code member.

2. A data control system for a machine of the kind comprising a tool storage station having a plurality of tool storage positions for storing a plurality of tools, a work station, and tool transfer means for transferring tools between said stations, comprising:

a plurality of individual code members each bearing code indicia identifying an individual tool;

mounting means, comprising a plurality of individual code member holders, for releasably and detachably mounting said code members at said storage station in association with but separate from the respective storage positions of the tools they identify;

sensing means for sensing the code indicia on said code members at said storage station;

control means, coupled to said sensing means, for actuating said transfer means to transfer a preselected tool from said storage station to said work station and back to said storage station, said code member being retained in its respective holder at said storage station;

and means, included in said control means, for restoring each tool to its original position in said tool storage station in association with its identifying code member, the last said means comprising means for effectively storing the identity of the tool while separated from its code member.

3. A data control system for a machine of the kind comprising a tool storage station having a plurality of tool storage positions for storing a plurality of tools, a work station, and tool transfer means for transferring tools between said stations, comprising:

a plurality of individual code members each bearing code indicia identifying an individual tool;

means for releasably and detachably mounting said code members at said storage station in association with but separate from the respective storage positions of the tools they identify;

sensing means for sensing the code indicia on said code members at said storage station;

control means, for actuating said transfer means to transfer a preselected tool from said storage station to said work station and back to said storage station in a position associated with its identifying code member, said code member being retained in mounted position in said storage station;

a source of stored data identifying tools to be selected for transfer to said work station and further identifying tools to be returned to said storage station;

and comparator means, coupled to said sensing means, for comparing said stored data in predetermined sequence with said code indicia on said code members to control selection and replacement of said tools.

4. A data control system for a machine of the kind comprising a tool storage station, having a plurality of tool storage positions and further having two different transfer locations, for storing a plurality of tools, a work station, and tool transfer means for transferring tools between said work station and said storage station transfer locations, in alternation, comprising:

a plurality of individual code members each bearing code indicia identifying an individual tool;

means for releasably and detachably mounting said code members at said storage station in association with but separate from the respective storage positions of the tools they identify; a pair of sensing means for sensing the code indicia on said code members to identify the tools instantaneously assigned to respective ones of said transfer locations at said storage station;

control means, coupled to said sensing means, for actuating said transfer means to transfer a preselected tool from said storage station to said work station and back to said storage station in a position associated with its identifying code member, said code member remaining in mounted position in said storage station;

means for storing data identifying each tool that is separated from its code member;

and means, included in said control means, for comparing said stored data with code indicia sensed by said two sensing means, in alternation.

5. A data control system for a machine of the kind comprising a tool storage station having a plurality of tool storage positions for storing a plurality of tools, a work station, and tool transfer means for transferring tools between said stations, comprising:

a plurality of individual code members each bearing code indicia identifying an individual tool;

mounting means for releasably and detchably mounting said code members at said storage station in assocation with but separate from the storage positions of the respective tools they identify;

sensing means for sensing the code indicia on said code members at said storage station;

control means, coupled to said sensing means, for actuating said transfer means to transfer a preselected tool from said storage station to said work station and back to said storage station without removing the associated code member from said storage station;

storage means for recording data identifying each tool as the tool is separated from its code member;

and comparator means, included in said control means and coupled to said sensing and storage means, for comparing the recorded data in said storage means with code indicia on said code members to effect restoration of each tool to a position in said storage station associated with the correct code member.

6. A data control system for a machine of the kind comprising a tool storage station including a movable tool matrix for storing a plurality of tools, a work station, and transfer means for transferring tools between said stations, comprising:

a plurality of individual code keys each having a plurality of key lugs identifying an individual tool in accordance with a predetermined binary code;

a plurality of individual key receptacles, on said matrix, for removably mounting said code keys at said storage station in association with but separate from the respective tools they identify;

sensing means for sensing the lugs on said code keys at a given location in said storage station;

control means, coupled to said sensing means, for actuating said transfer means to transfer a preselected tool from said storage station to said work station and back to said storage station;

and means for storing data representing the identity of the tool, while separated from its code member, to assure restoration to the tool matrix in association with the correct code key.

7. In a data control system for a machine of the kind comprising a tool storage matrix for storing a plurality of tools, means for moving said matrix to bring the tools sequentially to a transfer location, a work station, and transfer means for transferring tools between said work station and said transfer location, tool identification means comprising:

a plurality of individual code keys each bearing code indicia in the form of a plurality of key lugs identifying an individual tool in accordance with a predetermined code;

a plurality of individual key retainer devices for removably mounting said code members on said matrix in association with but separate from the respective tools they identify;

and a plurality of code indicator devices, mounted on said key retainers in position to engage said key lugs, for presenting the code data on said keys to a sensing device external to said matrix.

8. In a data control system for a machine of the kind comprising a tool storage matrix having a plurality of tool storage positions for storing a plurality of tools, and means for moving said matrix to bring the tools sequentially to an identification location, tool identification means comprising:

a plurality of individual code elements separate from said tools, each bearing code indicia identifying an individual tool;

a plurality of individual mounting devices adjacent said tool storage positions for releasably and detachably mounting said code elements on said matrix in association with the storage positions of the respective tools they identify and in position to be sensed by a sensing device external to said matrix;

and a sensing device adjacent said matrix for sensing the code indicia on said code members at said identification location.

References Cited in the file of this patent

UNITED STATES PATENTS

| | | |
|---|---|---|
| 1,320,152 | Klay | Oct. 28, 1919 |
| 2,901,927 | Morgan | Sept. 1, 1959 |
| 3,052,011 | Brainard et al. | Sept. 4, 1962 |
| 3,052,999 | Sedgwick et al. | Sept. 11, 1962 |

OTHER REFERENCES

"Planning For Manufacturing," Manual WS-59, published December 1959; Kearney & Trecker.